（12） United States Patent
Kamran et al.

(10) Patent No.: US 11,163,492 B2
(45) Date of Patent: Nov. 2, 2021

(54) MEDIA HICCUP MANAGEMENT IN A STORAGE SYSTEM

(71) Applicant: EMC IP Holding Company LLC, Hopkinton, MA (US)

(72) Inventors: Lior Kamran, Rishon LeZion (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/790,172

(22) Filed: Feb. 13, 2020

(65) Prior Publication Data

US 2021/0255797 A1    Aug. 19, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0683* (2013.01)

(58) Field of Classification Search
CPC .... G06F 3/0611; G06F 3/0659; G06F 3/0683; G06F 3/0604; G06F 3/0629; G06F 3/0688; G06F 3/0656
See application file for complete search history.

(56) References Cited

U.S. PATENT DOCUMENTS

| 2013/0339604 | A1* | 12/2013 | Zuluaga | G06F 3/0629 711/118 |
| 2017/0115891 | A1* | 4/2017 | O'Krafka | G06F 3/0604 |

* cited by examiner

*Primary Examiner* — Ernest Unelus
(74) *Attorney, Agent, or Firm* — Daly, Crowley, Mofford & Durkee, LLP

(57) ABSTRACT

A method for use in a storage system, the method comprising: receiving an I/O command; identifying a latency of a first storage device that is associated with the I/O command; and executing the I/O command at least in part based on the latency, wherein executing the I/O command based on the latency includes: performing a first action when the latency is less than a first threshold, and performing a second action when the latency is greater than the first threshold, wherein identifying the latency includes retrieving the latency from a latency database, and wherein the first storage device is part of a storage array, the storage array including one or more second storage devices in addition to the first storage device.

17 Claims, 11 Drawing Sheets

222

| | STORAGE DEVICE ID | READ LATENCY | WRITE LATENCY |
|---|---|---|---|
| 510A | 402A | 0.1 MS | 0.2 MS |
| 510B | 402B | 0.2 MS | 0.3 MS |
| 510C | 402C | 0.1 MS | 0.2 MS |
| 510D | 402D | 0.4 MS | 0.7 MS |
| 510E | 402E | 0.3 MS | 0.5 MS |
| 510F | 402F | 0.1 MS | 0.1 MS |

| STORAGE DEVICE ID | READ LATENCY | WRITE LATENCY |
|---|---|---|
| 402A | 0.1 MS | 0.2 MS |
| 402B | 0.2 MS | 0.3 MS |
| 402C | 0.1 MS | 0.2 MS |
| 402D | 0.4 MS | 0.7 MS |
| 402E | 0.3 MS | 0.5 MS |
| 402F | 0.1 MS | 0.1 MS |

MEDIA HICCUP MANAGEMENT IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for use in a storage system, the method comprising: receiving an I/O command; identifying a latency of a first storage device that is associated with the I/O command; and executing the I/O command at least in part based on the latency, wherein executing the I/O command based on the latency includes: performing a first action when the latency is less than a first threshold, and performing a second action when the latency is greater than the first threshold, wherein identifying the latency includes retrieving the latency from a latency database, and wherein the first storage device is part of a storage array, the storage array including one or more second storage devices in addition to the first storage device.

According to aspects of the disclosure, a system is provided, comprising: a memory; and at least one processor operatively coupled to the memory, the at least one processor being configured to perform the operations of: receiving an I/O command; identifying a latency of a first storage device that is associated with the I/O command; and executing the I/O command at least in part based on the latency, wherein executing the I/O command based on the latency includes: performing a first action when the latency is less than a first threshold, and performing a second action when the latency is greater than the first threshold, wherein identifying the latency includes retrieving the latency from a latency database, and wherein the first storage device is part of a storage array, the storage array including one or more second storage devices in addition to the first storage device.

According to aspects of the disclosure, a non-transitory computer-readable storage medium is provided that is configured to store one or more processor-executable instructions, which when executed by at least one processor further cause the at least one processor to perform the operations of: receiving an I/O command; identifying a latency of a first storage device that is associated with the I/O command; and executing the I/O command at least in part based on the latency, wherein executing the I/O command based on the latency includes: performing a first action when the latency is less than a first threshold, and performing a second action when the latency is greater than the first threshold, wherein identifying the latency includes retrieving the latency from a latency database, and wherein the first storage device is part of a storage array, the storage array including one or more second storage devices in addition to the first storage device.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
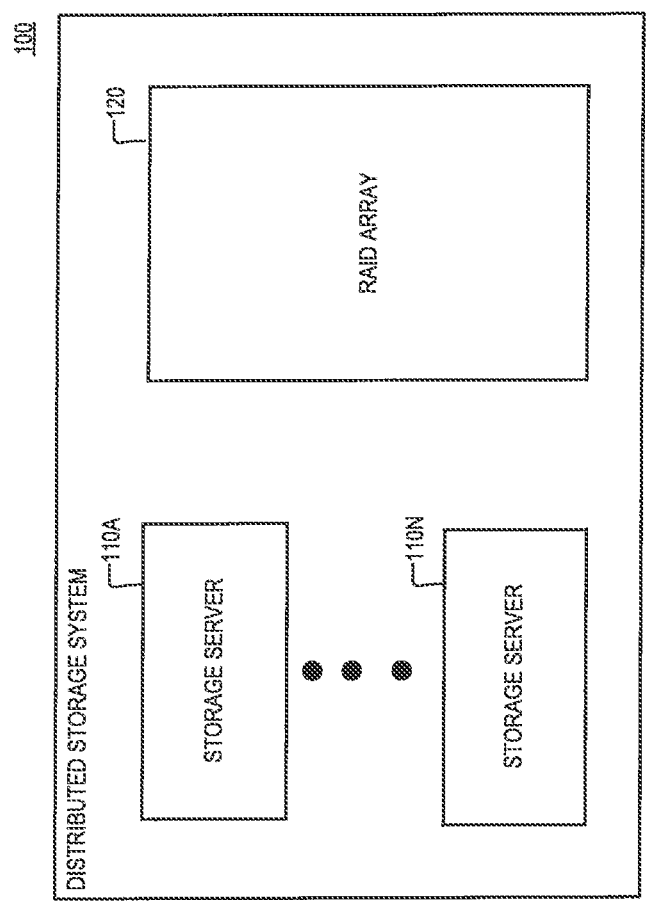
FIG. 1 is a diagram of an example of a storage system, according to aspects of the disclosure.

FIG. 1 is a diagram of an example of a storage system 100, according to aspects of the disclosure. As illustrated, the storage system 100 may include one or more storage servers 110 and a RAID array 120. The RAID array 120 may include a RAID 6 array and/or another type of RAID array, According to the present example, the storage system 100 is a content-addressable storage system. However, alternative implementations are possible in which the storage system 100 includes any other suitable type of storage system, such as a location-addressed storage system. Stated succinctly, the present disclosure is not limited to any specific type of storage system.

Figure 2:
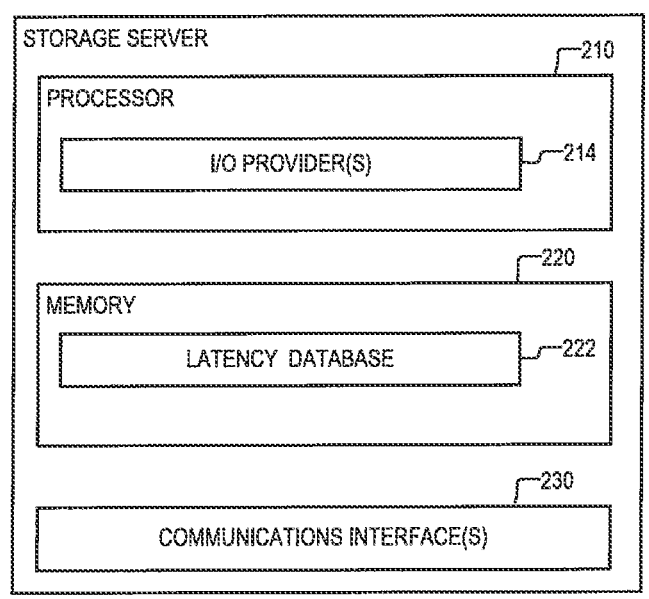
FIG. 2 is a diagram of an example of a storage server, according to aspects of the disclosure.

FIG. 2 is a diagram of an example of a storage server 110, according to aspects of the disclosure. The storage server 110, as the numbering suggests, is representative of any of the storage servers 110-1 through 110-N in the storage system 100. As illustrated, the storage server 110 may include a processor 210, a memory 220, a communications interface(s) 230. The processor 210 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 220 may include any suitable type of volatile and/or non-volatile memory. In some implementations, the memory 220 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 230 may include any suitable type of communications interface, such as one or more Ethernet adapters, one or more Wi-Fi adapters (e.g., 802.1414 adapters), and one or more Long-Term Evolution (LTE) adapters, for example.

According to the present example, the processor 210 may be configured to execute at least I/O provider(s) 214. The I/O provider(s) 214 may include one or more processes for executing incoming I/O requests (e.g., write requests). Although, in the present example, the I/O provider(s) 214 are implemented in software, alternative implementations are possible in which the I/O provider(s) 214 are implemented in hardware or as a combination of hardware and software. Stated succinctly, the present disclosure is not limited to any specific implementation of the I/O provider. As used throughout the disclosure, the term "I/O provider" may refer to one or more processes which, alone or in combination with other processes, are configured to execute 110 requests that are received at the storage system 100, such as write requests for example. The I/O provider(s) 214 are discussed further below with respect to FIG. 3. According to the present example, the memory 220 may be configured to store a latency database 222. The latency database 222 is discussed further below with respect to FIG. 5. Although in the example of FIG. 5 the latency database 222 is depicted as being stored in the memory of the storage server 110, it will be understood that the latency database 222 may be stored at any memory location in the storage system 100 for as long as it is accessible to the storage server 110 and/or any processes or threads that are executed on the storage server 110.

Figure 3:
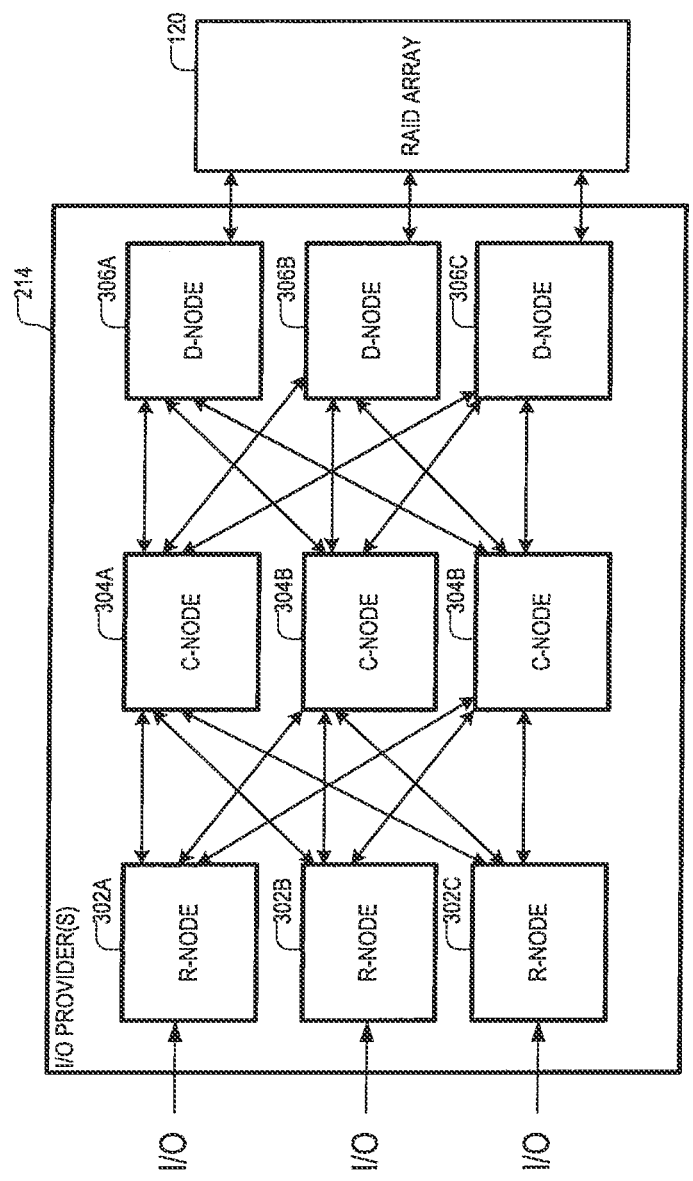
FIG. 3 is a diagram of an example of an I/O provider that is executed by the storage server of FIG. 2, according to aspects of the disclosure.

FIG. 3 is a diagram illustrating an example of one implementation of the 110 provider(s) 214. According to the present example, the I/O provider(s) 214 includes I/O providers 302, 304, and 306, which are herein referred to as routing nodes (R-nodes), control nodes (C-nodes), and data nodes (D-nodes) respectively. The R-nodes, the C-nodes, and the D-nodes are connected to one another in a mesh network. According to the present example, the Imo-nodes, the C-nodes, and the D-nodes are part of the same I/O provider, and as such, they are executed on the same storage server. However, it will be understood that alternative implementations are possible in which at least some of the R-nodes, the C-nodes, and the D-nodes are executed on different storage servers and/or are part of different I/O providers.

The R-nodes 302 may be configured to terminate I/O requests received at the storage system 100 and route them to appropriate C-nodes 304 and D-nodes 306 for further execution. In doing so, the R-nodes 302 may distribute a workload over multiple C-nodes 304 and D-nodes 306.

The C-nodes 304 may be configured to control the execution of C-node commands supplied by the R-nodes 302. The C-node commands may be used to implement read requests, write requests, and/or any other suitable type of I/O request. In addition, each of the C-nodes 304 may maintain and manage key metadata elements. Each of the C-nodes 304 may be configured to receive C-node commands from the R-nodes and communicate with the D-nodes 306 to execute the commands.

The D-nodes 306 may be configured to control the execution of D-node commands supplied by the C-nodes 304 by reading and/or writing data to the RAID array 120. Each of the D-nodes 306 may be configured to map hash digests received from the C-nodes (in respective D-node commands) to different physical locations in the RAID array 120. In some implementations, the mapping may be performed by using a hash-to-physical address (H2P) structure (not shown) that is stored in the memory of any of the D-nodes 306.

In operation, any of the R-nodes 302 may receive an I/O request that spans a range of logical data addresses (LDAs) from a multipath agent. The request may include a block of data and an opcode identifying an action that is required to be performed. In response to the request, the R-node 302 may identify a plurality of C-nodes 304. Afterwards, the R-node 302 may decompose the I/O request into a plurality of C-node commands and forward the C-node commands to the identified C-nodes 304 for further processing.

In operation, any of the C-nodes 304 may receive a C-node command that is generated by one of the R-nodes 302. Upon receiving the C-node command, the C-node 304 may generate one or more D-node commands and supply the generated D-node commands to corresponding D-nodes 306 for further processing. In some implementations, any of the D-node commands may include a command to retrieve or store data in the RAID array 120. In such implementations, the D-node command may include either data desired to be stored in the RAID array 120 or a hash digest of data that is desired to be retrieved from the RAID array 120.

In operation, any of the D-nodes 306 may receive a D-node command that is generated by one of the C-nodes 304. Next, the D-node 306 may identify a physical address in the RAID array 120 that corresponds to a hash digest that is contained in the D-node command. Afterwards, the D-node 306 may either store a payload of the D-node command (i.e., a block of data contained in the D-node command) at the identified physical address or retrieve from the RAID array 120, a data block that is stored at the identified address. In some implementations, the D-node commands may be executed by generating device-level instructions (e.g., SCSI instructions) and providing the SCSI instructions to respective ones of the storage devices in the RAID array 120. Such device-level instructions may include read instructions, write instructions, and/or any other suitable type of instructions. For example, and without limitation, a device-level instruction may include an instruction that is executed by a controller of a storage device controller (e.g., a controller that is part of storage device), rather than a controller or processor that is connected to the storage device via a data transfer interface such as SCSI, USB, PCI, PCIe, etc.

Figures 4, 5:
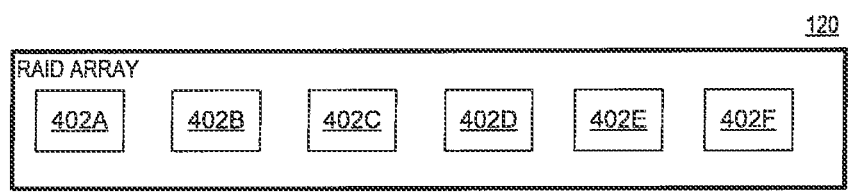
FIG. 4 is a diagram illustrating a physical configuration of a Redundant Array of Independent Disks (RAID) array, according to aspects of the disclosure.
FIG. 5 is a diagram of an example of a latency database, according to aspects of the disclosure.

FIG. 4 is a diagram showing a physical arrangement of the RAID array 120, according to aspects of the disclosure. As illustrated, the RAID array 120 may include a plurality of storage devices 402 (e.g., storage devices 402A-402F). According to the present example, each of the storage devices 402 includes a solid-state drive (SSD). However, alternative implementations are possible in which any of the storage devices 402 includes another type of storage device, such as a hard disk (HD) or a non-volatile random-access memory (nvRAM) device. The RAID array 120 may be arranged in a mirrored configuration (e.g., RAID 1) or in a parity configuration (RAID 6). When one or more of the storage devices 402 fails or otherwise becomes inaccessible (e.g., due to excessive latency), data stored on the failed storage device(s) 402 may be recovered from the other storage devices 402 that remain operational be executing what is herein referred to as a "recovery operation." For instance, when the RAID array 120 is arranged in a mirrored configuration, a copy of the data that was on the failed storage device(s) 402 may be retrieved from "mirrors" that are stored on the storage devices 402 that remain operational. As another example, when the RAID array 120 is arranged in a parity configuration, data stored on the failed storage device(s) 402 may be calculated based on parity data and/or user data that is available on the storage devices 402 that remain operational. It will be understood that the present disclosure is not limited to any specific method for data recovery.

FIG. 5 is a diagram showing the latency database 222, according to aspects of the disclosure. As illustrated, the latency database 222 may identify a read and/or write latency for each (or at least some) of the storage devices in the RAID array 120. Specifically, the latency database 222 may include a plurality of entries 510. Each entry 510 may correspond to a different storage device 402, and it may identify the read and write latency for that device. For instance, entry 510A may identify the read and write latency for storage device 402A; entry 510B may identify the read and write latency for storage device 402B; entry 510C may identify the read and write latency for storage device 402C; entry 510D may identify the read and write latency for storage device 402I); entry 510E may identify the read and write latency for storage device 402E; and entry 510F may identify the read and write latency for storage device 402F.

In some implementations, the read latency for any storage device 402 may include the latency at which the storage device has executed the most recent read device-level instruction that is provided to the storage device 402. For instance, every time (or every $3^{rd}$ time, every $5^{th}$ time, or every n-th time) a D-node provides a read instruction to any of the storage devices 402, the D-node may calculate how long it takes for the storage device 402 to return data that is associated with the instruction, and enter the duration of this period in the database 222 as the storage device's 402 current read latency.

In some implementations, the write latency for any storage device 402 may include the latency at which the storage device has executed the most recent write device-level instruction that is provided to the storage device 402, For instance, every time (or every $3^{rd}$ time, every $5^{th}$ time, or every n-th time) a D-node provides a write instruction to any of the storage devices 402, the D-node may calculate how long it takes for the storage device 402 to return an acknowledgment that is associated with the instruction, and enter the duration of this period in the database 222 as the storage device's 402 current write latency.

In some implementations, a D-node (and/or any other node in the storage system 100) may update the latency database 222 by using artificial device-level commands. For instance, the D-node may detect whether a predetermined time period has passed since the most recent retrieval of data from the storage device 402. Next, if the predetermined time period has passed, the D-node may generate an artificial device-level read instruction (e.g., a SCSI read command) and transmit the artificial device-level read instruction to the storage device 402. And finally, the D-node may determine the latency at which the device level read instruction is executed, and store the latency in the latency database 222. As used throughout the disclosure, the term "artificial device-level read instruction" shall refer to an instruction that is transmitted to a storage device for the purpose of determining the read latency of the storage device, rather than to service an incoming read request.

As another example, the D-node may detect whether a predetermined time period has passed since the most recent storing of data on the storage device 402. Next, if the predetermined time period has passed, the D-node may generate an artificial device-level write instruction (e.g., a SCSI write command) and transmit the artificial device-level write instruction to the storage device 402. And finally, the D-node may determine the latency at which the device level write instruction is executed and store the latency in the latency database 222. As used throughout the disclosure, the term "artificial device-level write instruction" shall refer to an instruction that is transmitted to a storage device for the purpose of determining the write latency of the storage device, rather than to service an incoming write request.

Due to the electric properties of EEPROM memory, the read/write latency of solid-state drives tend to increase disproportionally when the drive's controllers perform garbage collection, flash translation layer (FTL) management, and/or other background tasks, in such periods, the read/write latency of SSDs may increase greatly (e.g., ten-fold or one-hundred-fold, etc.), which in turn can affect negatively the overall latency of the storage system 100. In this regard, as is discussed further below, the latency database 222 may be used to detect when the read/write latency of a storage device increases and take measures to soften and/or altogether avoid any negative impact of the increased read/write latency. Examples of processes that use a latency database (such as the latency database 222) to improve the execution of various types of read and write requests are discussed further below with respect to FIGS. 6-12B.

According to the example of FIG. 5, each of the entries 510 includes a most recent or actual latency of the storage device that is associated with the execution of a single recent read or write instruction that is provided to the storage device. For instance, in any given entry 510, the read latency that is stored in that entry 510 may identify how long it took the entry's 510 respective storage device 510 to complete a read instruction that was recently provided to that storage device 402 (e.g., a most recent read instruction). As another example, in any given entry 510, the write latency that is stored in that entry 510 may identify how long it took the entry's 510 respective storage device 402 to complete a write instruction that was recently provided to that storage device 402 (e.g., a most recent write instruction). One advantage of storing in the database "most recent" or "actual" read/write latency, rather than average latency, is that the "most recent" or "actual" latency may identify more clearly spikes in the latency of the storage devices 402, which might be otherwise masked if an average latency is used.

Although in the example of FIG. 5 each of the entries 510 stores actual read latency, alternative implementations, are possible in which any of the entries 510 stores average read latency (e.g., the average of two or more most recent read latency measurements for the entry's storage device). Although in the example of FIG. 5 each of the entries 510 stores actual write latency, alternative implementations, are possible in which any of the entries 510 stores average write latency (e.g., the average of two or more most recent write latency measurements for the entry's storage device). The present disclosure is not limited to any specific method for managing the latency database 222. For instance, in some implementations, each D-node in the storage system 100 may maintain its own copy of the latency database 222, which reflects only the latencies at which read/write instructions issued by this D-node are completed by the storage devices 402. As another example, in some implementations, the latency database 222 may be shared among different D-nodes (and/or storage servers 110), and it may reflect the latencies at which read/write instructions issued by the D-nodes (and/or storage servers 110) are completed by the storage devices 402. As used throughout the disclosure, the term "database" may refer to one or more data structures that are used to store information.

Figure 6:
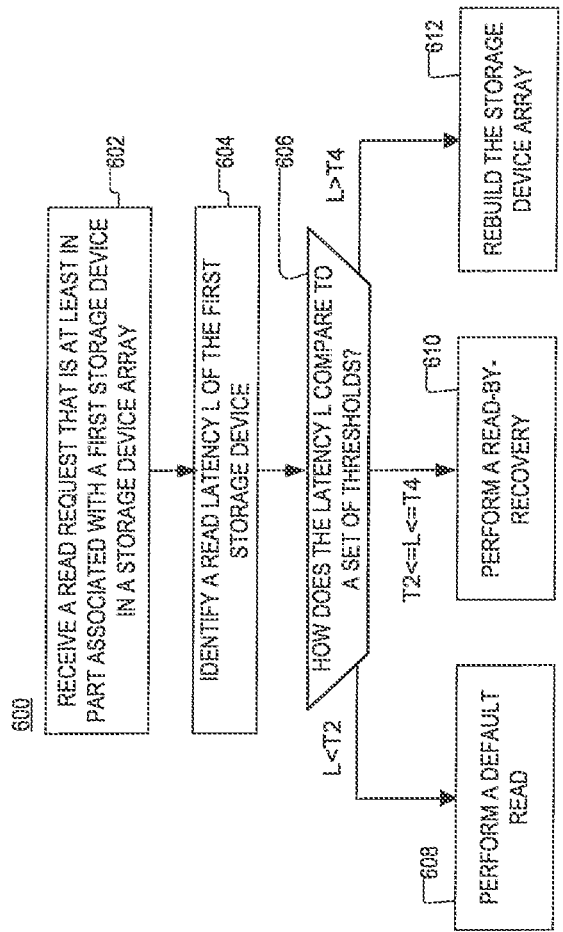
FIG. 6 is a flowchart of an example of a process, according to aspects of the disclosure.

FIG. 6 is a flowchart of an example of a process 600, according to aspects of the disclosure. At step 602, a storage node receives a read request that is at least in part associated with a first storage device in a storage device array, wherein the storage device array includes one or more second storage devices in addition to the first storage device. At step 604, the storage node retrieves the read latency L of the first storage device from a latency database. At step 606, the storage node detects how the read latency L compares to thresholds T2 and T4, where T2<T4, If L<T2, the process 600 proceeds to step 608. If T2<=L<T4, the process 600 proceeds to step 610. If L>T4, the process 600 proceeds to step 612. At step 608, the storage node performs a default read operation. The default read operation may include retrieving a data item associated with the read request from the first storage device. At step 610, the storage device performs a read-by-recovery operation for the data item. The read-by-recovery operation may include calculating the data item (i.e., the data item stored on the first storage device) based on parity data that is stored on one or more of the second storage devices in the storage device array. In some implementations, the read-by-recovery operation may be performed independently of (e.g., without retrieving data from) the first storage device. At step 612, the storage node rebuilds the storage device array.

According to the present example, the phrase "rebuilding the storage device array" and its inflected forms may refer to any action by the storage node, which at least in part causes the storage device array to be rebuilt. For example, the storage node may transmit, to a management system (not shown), an instruction which, when received by the management system causes the management system to rebuild the storage device may. In some implementations, when the data item is retrieved at steps 608 or 610, the data item may be returned to a sender of the read request. In some implementations, when the storage device array is rebuilt (at step 612), an error may be generated indicating the read request cannot be completed.

Figure 7:
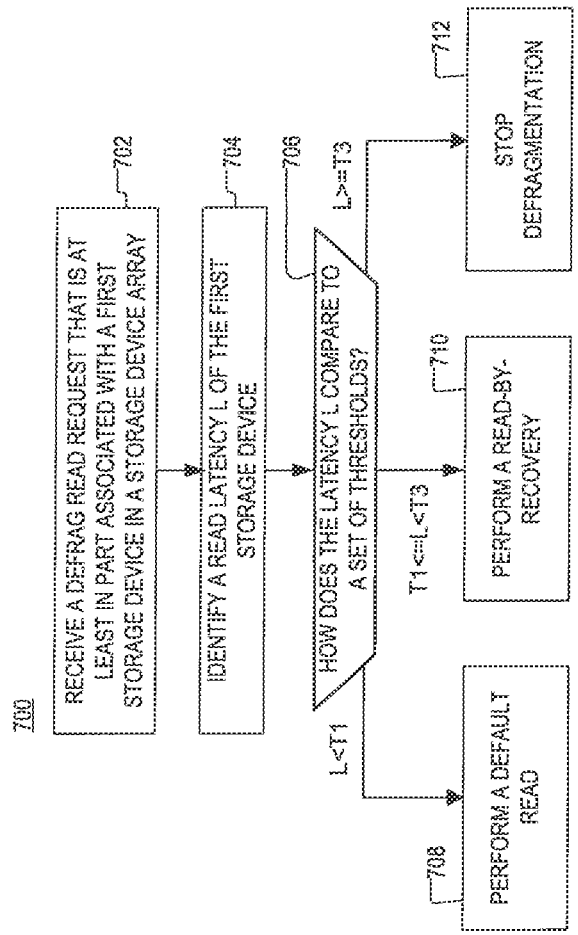
FIG. 7 is a flowchart of an example of a process, according to aspects of the disclosure.

FIG. 7 is a flowchart of an example of a process 700, according to aspects of the disclosure. At step 702, a storage node receives a defragmentation read request (hereinafter "defrag read request") that is at least in part associated with a first storage device. The first storage device is part of a storage device array that includes one or more second storage devices in addition to the first storage device. The defrag read request may be issued by a device or process that is executing a defragmentation process on the storage device array. At step 704, the storage node retrieves the read latency L of the first storage device from a latency database. At step 706, the storage node detects how the read latency L of the first storage device compares to thresholds T1 and T3, where T1<T3. If L<T1, the process 700 proceeds to step 708. If T1<=L<T3, the process 700 proceeds to step 710. If L>=T3, the process 400 proceeds to step 712. At step 708, the storage node performs a default read operation. The default read operation may include retrieving a data item associated with the defrag read request from the first storage device. At step 710, the storage device performs a read-by-recovery operation for the data. The read-by-recovery operation may include calculating the data item based on parity data that is stored on one or more of the second storage devices in the storage device array. In some implementations, the read-by-recovery operation may be performed independently of (e.g. without retrieving data from) the first storage device. At step 712, the storage node causes the defragmentation process to stop defragmentation of the storage device array. For example, in some implementations, the storage node may transmit to a management system (not shown) a message, which when received by the management system, causes the management system to suspend or abort the defragmentation process. In some implementations, when the data item is retrieved at steps 608 or 610, the data item may be returned to a sender of the defrag read request. In some implementations, when the defragmentation process is stopped, an error may also be generated, indicating that the defrag request cannot be completed.

Figure 8:
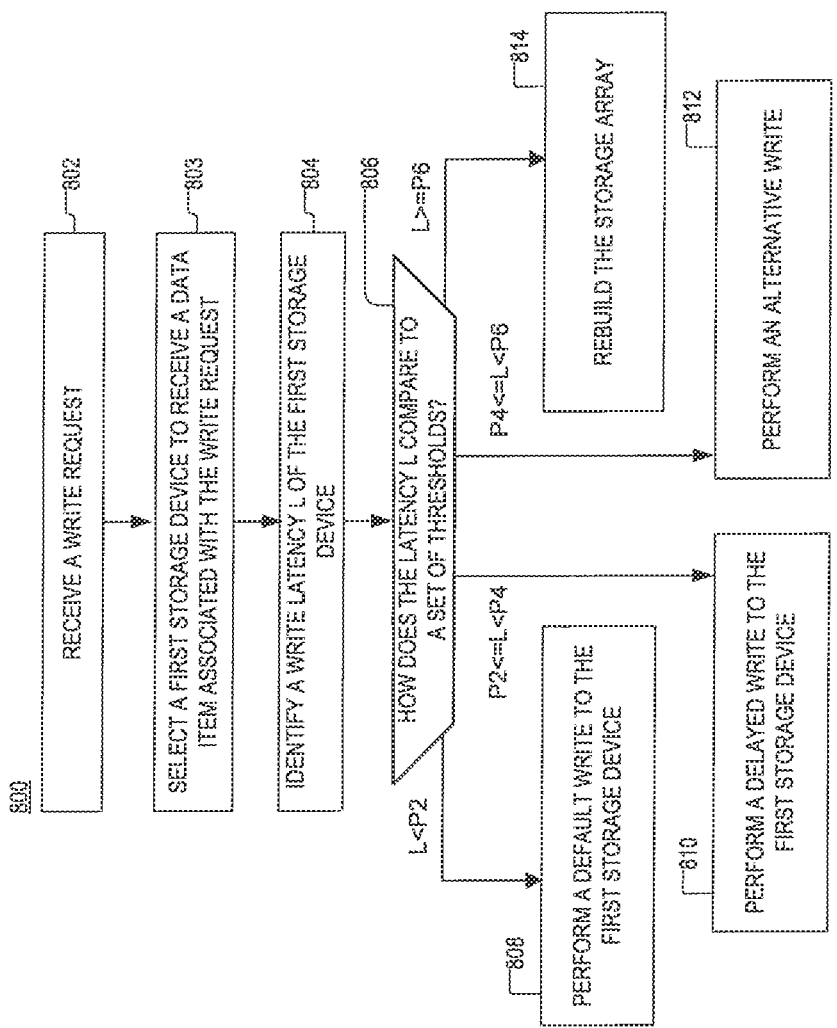
FIG. 8 is a flowchart of an example of a process, according to aspects of the disclosure.

FIG. 8 is a flowchart of an example of a process 800, according to aspects of the disclosure. At step 802, a storage node receives a write request. At step 803, the storage node selects a first storage device to receive a data item associated with the write request. The first storage device is part of a storage device array that includes one or more second storage devices in addition to the first storage device. The first storage device may be selected based on data contained in the write request and/or other metadata that is used by the storage node to perform data writes. At step 804, the storage node retrieves the write latency of the first storage device from a latency database. At step 806, the storage node determines how the latency L compares to thresholds P2, P4, and P6, where P2<P4<P6, If L<P2, the process 800 proceeds to step 808. If P2<=L<P4, the process 800 proceeds to step 810. If P4<L<P6, the process 800 proceeds to step 812, If L>P6, the process 800 proceeds to step 814. At step 808, the storage node performs a default write operation. Performing the default write operation may include writing a data item associated with the write request to the first storage device. At step 810, the storage node performs a delayed write, Performing the default write may include storing the data item at a temporary location and subsequently copying the data to the first storage device. The subsequent copying of the data may be performed after completion of the write request is acknowledged by the storage node. At step 812, the storage node performs an alternative write. Performing an alternative write may include writing the data item to one or more of the second storage devices. At step 814, the storage node rebuilds the storage array. Step 814 may be performed as discussed above with respect to step 612.

In some respects, the process 800 is suitable for use in content-addressable systems, and may be performed by a D-node in any such system, in content-addressable systems, as is well-known, data is stored and retrieved based hash digests of the data, and D-nodes have flexibility in determining the physical location where data is stored (rather than the physical location being specified by a client). Furthermore, in some implementations, when the data item is stored (e.g., at steps 808, 810, an 812), an acknowledgment may be transmitted to a sender of the write request indicating that the write request has been completed successfully. In instances in which the write request is associated with multiple data items, the acknowledgment may be transmitted only after each of the data items is stored in the storage array in accordance with steps 803-812.

Figure 9:
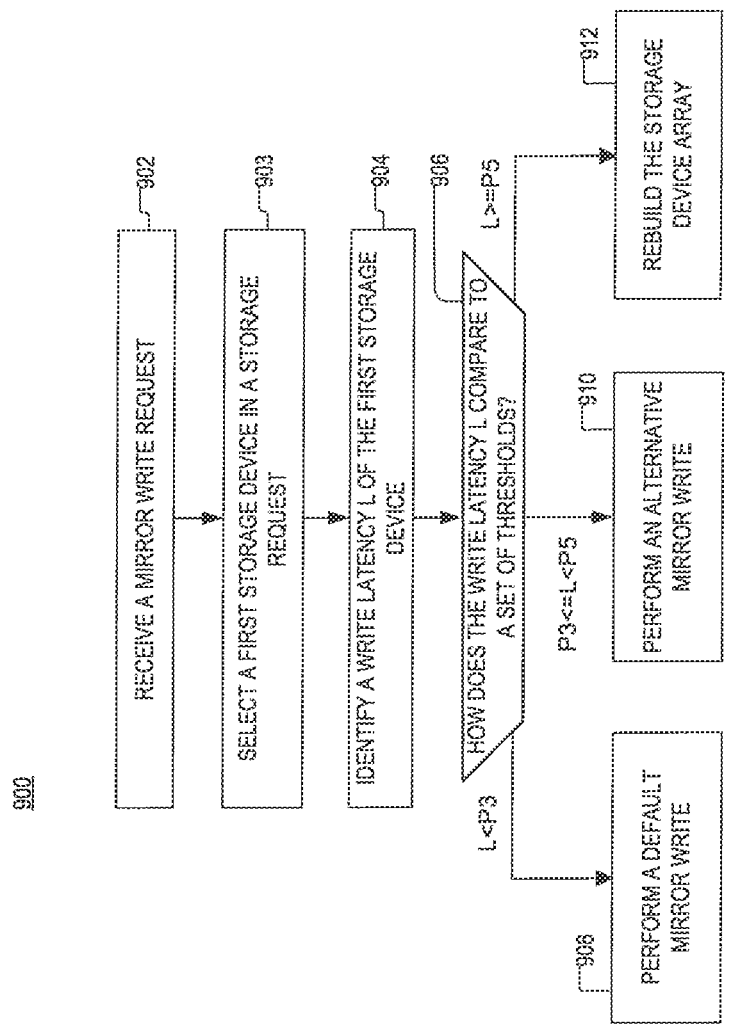
FIG. 9 is a flowchart of an example of a process, according to aspects of the disclosure.

FIG. 9 is a flowchart of an example of a process 900, according to aspects of the disclosure. At step 902, a storage node receives a mirror write request. At step 903, the storage node selects a first storage device in a storage array. The storage array may include one or more second storage devices in addition to the first storage device. At step 904, the storage node retrieves the write latency of the first storage device from a latency database. At step 906, the storage node determines how the latency L compares to thresholds P3 and P5, where P3<P5. If L<P3, the process 900 proceeds to step 908. If P3<=L<P5, the process 900 proceeds to step 910. If L>=P6, the process 900 proceeds to step 912. At step 908, the storage node performs a default mirror write operation. Performing the default mirror write operation may include writing a data item associated with the mirror write request to each of the first storage device and the second storage devices. At step 910, the storage node performs an alternative mirror write operation. Performing the alternative mirror write operation may include writing the data item associated with the mirror write request to each (or at least some) of the second storage devices, but not the first storage device. In some implementations, when the alternative mirror write operation is performed, the data item may be copied to the first storage device at a later time (after completion of the mirror write request is acknowledged). At step 912, the storage node rebuilds the storage array. Step 912 may be performed as discussed above with respect to step 612.

The process 900 is presented in the context of a mirrored storage device array, in which each of a plurality of storage devices stores a copy of the same data. According to the process 900, the storage of a data item on a first storage device is predicated on the latency of the first storage device is below a threshold P3. However, it will be understood that in some implementations, storage of the data item on any of the storage devices in the mirrored storage device array may be predicated on the latency of that storage device being below the threshold P3. According to the process 900, the rebuilding of the storage device array is predicated on the latency of the first storage device exceeding a threshold P5. However, it will be understood that in some implementations, the rebuilding of the storage device array may be predicated on the latency of any of the storage devices in the storage array exceeding the threshold P5. In some implementations, when the data item is stored (e.g., at steps 908 or 910), an acknowledgment may be transmitted to a sender of the write request indicating that the write request has been completed successfully. In instances in which the write request is associated with multiple data items, the acknowledgment may be transmitted only after each of the data items is stored in the storage array in accordance with steps 903-912.

Figure 10:
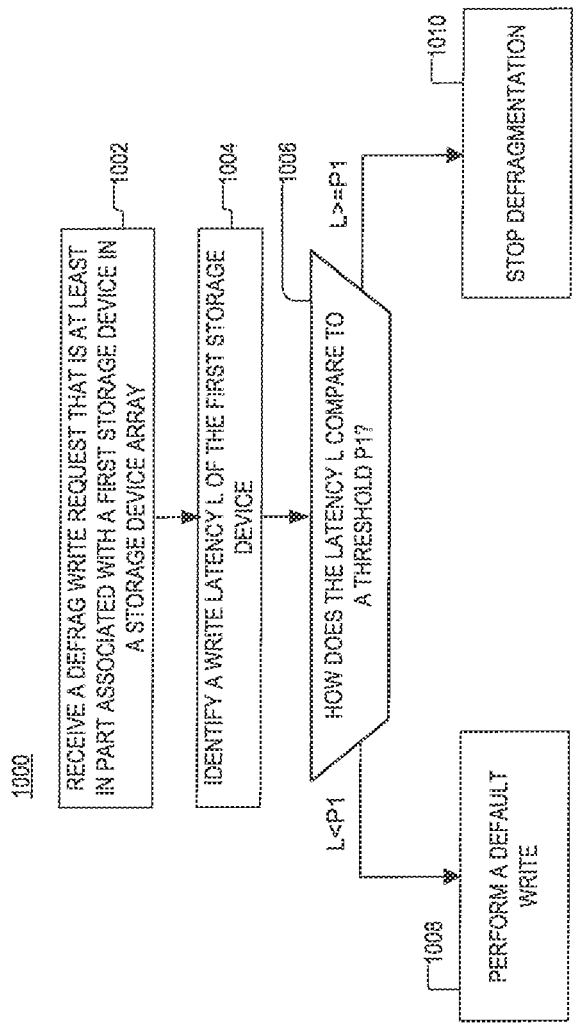
FIG. 10 is a flowchart of an example of a process, according to aspects of the disclosure.

FIG. 10 is a flowchart of an example of a process 1000, according to aspects of the disclosure. At step 1002, a storage node receives a defragmentation write request (hereinafter "defrag write request") that is at least in part associated with a first storage device. The first storage device is part of a storage device array that includes one or more second storage devices in addition to the first storage device. At step 1004, the storage node retrieves the write latency L of the first storage device from a latency database. At step 1006, how the read latency L of the first storage device compares to a threshold P1. If. L<P1, the process 1000 proceeds to step 1008. If L>=P1, the process 1000 proceeds to step 1010. At step 1008, the storage node performs a default write operation. Performing the default write operation may include writing a data item associated with the defrag write request to the first storage device. At step 1010, the storage node causes the defragmentation process to stop defragmentation of the storage array. Step 1010 may be performed as discussed above with respect to step 712.

In some implementations, when the data item is stored (e.g., at steps 908 or 910) an acknowledgment may be transmitted to a sender of the write request indicating that the write request has been completed successfully. In instances in which the write request is associated with multiple data items, the acknowledgment may be transmitted only after each of the data items is stored in the storage array in accordance with steps. In some implementations, when the defragmentation process is stopped, an error may also be generated, indicating that the defrag read request cannot be completed.

Figure 11:
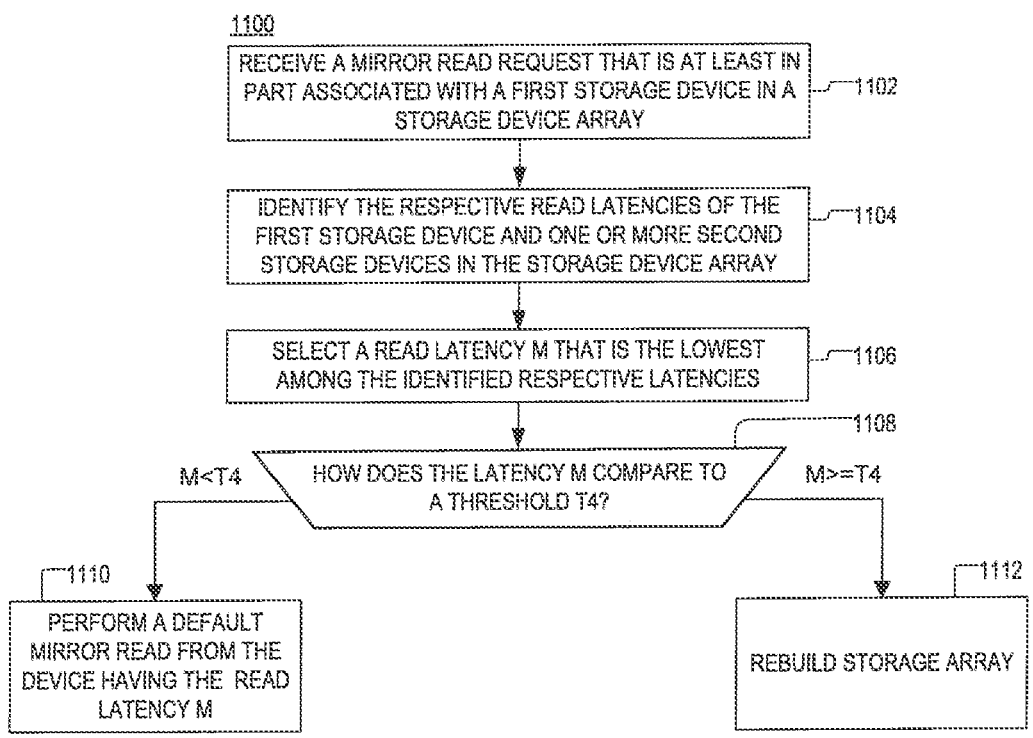
FIG. 11 is a flowchart of an example of a process, according to aspects of the disclosure.

FIG. 11 is a flowchart of an example of a process 1100, according to aspects of the disclosure. At step 1102, a storage node receives a mirror read request. At step 1104, the storage node retrieves, from a latency database, the respective read latencies of a plurality of storage devices that are part of a storage device array. At step 1106, the storage node identifies the lowest read latency M among the retrieved read latencies. At step 1108, the storage node determines how the read latency M compares to a threshold T4, if L<T4, the process 1100 proceeds to step 1110. If M>=T4, the process 1100 proceeds to step 1112. At step 1110, the storage node performs a default mirror read operation from the storage device having the read latency. Performing the default mirror read may include retrieving a data item associated with the read request from one of the storage devices in the storage array that has the lowest read latency among all (or at least some) storage devices in the storage array. At step 1112, the storage node rebuilds the storage array. Step 1112 may be performed as discussed above with respect to step 612. In some implementations, when step 1112 is performed, an error may also be generated, indicating that the defrag read request cannot be completed.

Figure 12A:
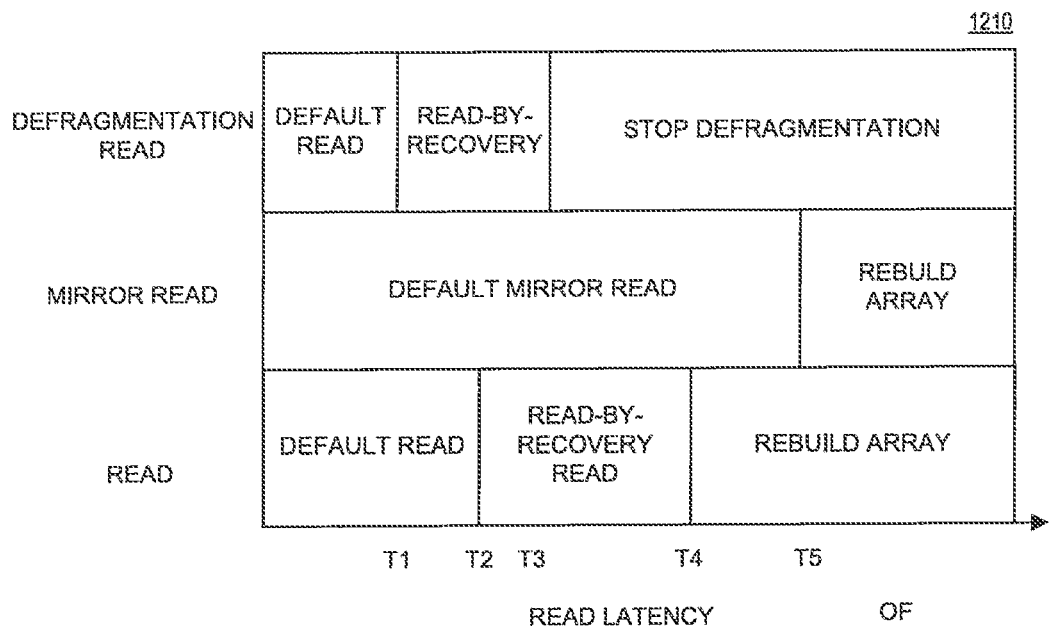
FIG. 12A is a schematic diagram illustrating aspects of the processes of FIGS. 6, 7, and 11, according to aspects of the disclosure.

FIG. 12A shows a chart 1210 that illustrates aspects of processes 600, 700, and 1100, which are discussed above with respect to FIGS. 6, 7, and 11, respectively. More particularly, chart 1210 illustrates that when a particular type of read request is received at a storage node, the storage node may take a different action depending on the read latency of one or more storage devices in a storage array that are associated with the read operation. For example, in response to receiving a read request, the storage node may: (i) execute a default read when the read latency of a storage device is below a threshold T2, (ii) execute a read-by-recovery when the read latency of the storage device is between thresholds T2 and T4, and (iii) rebuild the storage array when the read latency or the storage device is above the threshold T4. In response to receiving a mirror read request, the storage node may: (i) execute a default mirror read when the lowest read latency among the latencies of the storage devices in the storage array is below a threshold T5, and (ii) rebuild the storage array when the lowest read latency is above the threshold T5. In response to a defrag read request, the storage node may: (i) execute a default read when the read latency of a storage device is below a threshold. T1, (ii) execute a read-by-recovery when the read latency of the storage device is above the threshold T1 and below a threshold T3, and stop a defragmentation of the storage array when the read latency of the storage device is above the threshold T3. According to the example of FIG. 12A, the thresholds T1-T5 have the following relationship: T1<T2<T3<T4<T5. However, it will be understood that alternative implementations are possible in which any two (or more) of the thresholds T1-T5 have different relative magnitudes.

Figure 12B:
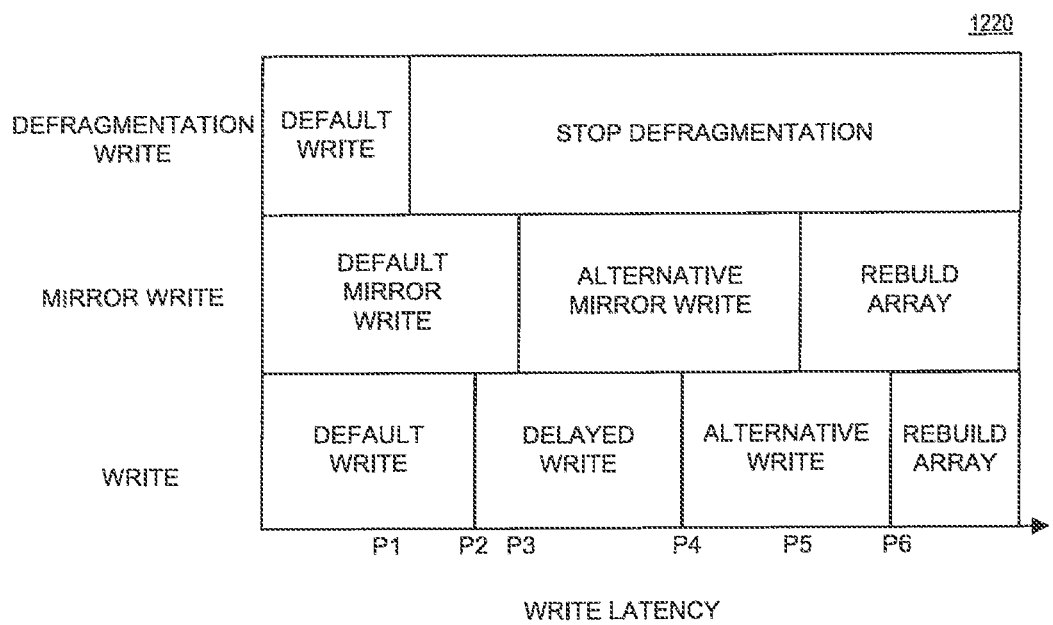
FIG. 12B is a schematic diagram illustrating aspects of the processes of FIGS. 8, 9, and 10, according to aspects of the disclosure.

FIG. 12B shows a chart 1220 that illustrates aspects of processes 800, 900, and 1000, which are discussed above with respect to FIGS. 8, 9, and 10, respectively. More particularly, chart 1220 illustrates that when a particular type of write request is received at a storage node, the storage node may take a different action depending on the write latency of one or more storage devices in a storage array that is associated with the write operation. For example, in response to receiving a write request, the storage node may: (i) execute a default write when the write latency of a storage device is below a threshold P2, (ii) execute a delayed write when the write latency of the storage device is between thresholds P2 and P4, (iii) execute an alternative write when the write latency of the storage device is between thresholds P4 and P6, and (iv) rebuild the storage array when the write latency of the storage devices is above the threshold P6. In response to receiving a mirror write request, the storage node may (i) execute a default mirror write when the write latency of the storage device is below a threshold P3, (ii) execute an alternative mirror write when the write latency of the storage device is between thresholds P3 and P5, and (iii) rebuild the storage array when the write latency of the storage device is above the threshold P5. In response to receiving a defrag write request, the storage node may: (i) execute a default write when the write latency of a storage device is below a threshold P1, and (ii) rebuild the storage array when the write latency of the storage device is above the threshold P1. According to the example of FIG. 12B, the thresholds P1-P6 have the following relationship: P1<P2<P3<P4<P5<P6. However, it will be understood that alternative implementations are possible in which any two (or more) of the thresholds P1-P6 have different relative magnitudes.

As noted above, each of the processes 600-1100 is performed by a storage node. The storage node may be part of any suitable type of distributed storage system. According to the example of FIGS. 6-11, the storage system is a content-addressable storage system, such as the storage system 100, which is discussed above with respect to FIG. 1. However, it will be understood that the present disclosure is not limited to any specific type of storage system. Those of ordinary skill in the art will readily recognize, after reading this disclosure, that at least some of the concepts and ideas presented herein can be applied in other types of storage systems, such as location-addressed storage system, According to the example of FIGS. 6-11, the storage node performing the processes 600-900 is a D-node, such as any of the D-nodes 306, which are discussed above with respect to FIG. 1. However, alternative implementations are possible in which the storage node performing any of the processes 600-1100 is another type of storage node. As used throughout the disclosure, the term storage node may refer to any suitable type of computing device (e.g., a storage server, etc.) and/or a process (or thread) that is executed on such computing device.

According to the example of FIGS. 6-11, a request to perform an operation is associated with a first storage device if the request necessitates accessing the storage device for the purposes of storing or retrieving one or more data items (associated with the request) from the storage device. In some implementations, a request to perform an operation may be associated with the first storage device when the request includes (or otherwise indicates) an address in an address space of the storage device. By way of example, the address may be identified directly (e.g., by using an address identifier) and/or indirectly (e.g., by using a hash digest or another identifier that is mapped by metadata to the address).

As discussed above, with respect to FIGS. 6-11, examples of a request to perform an operation include a read request, a mirror read request, a defrag read request, a write request, a mirror write request, and a defrag write request. The term "request" as used throughout the disclosure may include one or more of: (i) include a command or directive that is received at the storage system from an external device (e.g., a host or client device), (ii) a command or directive that is generated internally within the storage system for the purposes of servicing another request that is received at the storage system from an external device, or (iii) a command or directive that is generated internally within the storage system either as part of executing an internal processes (e.g., defragmentation, garbage collection, etch) for the purposes of maintenance of the storage system.

What is herein referred to as a "defrag read request" may include any request that is issued by a node in the storage system for the purposes of defragmenting the storage array. What is herein referred to as "a mirror read request" may include any request to retrieve data from a mirroring storage array (e.g., a RAID 1 array). What is herein referred to as "a read request" may include any request to retrieve data from a non-mirroring storage array (e.g., a RAID 0, RAID 1 or RAID 6 array). The present disclosure is not limited to any method for distinguishing, defrag read requests from the other types of read requests. By way of example, a defrag read request may be distinguished (from a read request or a mirror read request) based on having a different opcode. As another example, a defrag read request may be distinguished (from a read request or a mirror read request) based on an ID of the node (or other entity) that issued the request (or caused the request to be issued). For example, a defrag read request may be associated with a defragmentation process that is executed within the storage system, whereas a read request (or a mirror read request) may be associated by a process that is executed within the storage system for the purposes of providing data to external computing devices.

What is herein referred to as a "defrag write request" may include any request that is issued by a node in the storage system for the purposes of defragmenting the storage array. What is herein referred to as "a mirror write request" may include any request to store data on a mirroring storage array (e.g., a RAID 1 array or a custom mirroring array). What is herein referred to as "a write request" may include any request to store data on a non-mirroring storage array (e.g., a RAID 0, RAID 1 or RAID 6 array). The present disclosure is not limited to any method for distinguishing, defrag write requests from the other types of write requests. By way of example, a defrag write request may be distinguished (from a write request or a mirror write request) based on having a different opcode. As another example, a defrag write request may be distinguished (from a write request or a mirror write request) based on an ID of the node (or other entity) that issued the request (or caused the request to be issued). For example, a defiag write request may be associated with a defragmentation process that is executed within the storage system, whereas a write request (or a mirror write request) may be associated by a process that is executed within the storage system for the purposes of providing data to external computing devices.

The processes 600-1000 are described in the context of a request that is associated with a first storage device in a storage array. It will be understood that any request that is associated with the first storage device may be associated either exclusively or non-exclusively with the first storage device. For example, a read request that is associated with the first storage device exclusively may require the retrieval of data items from the first storage device only. As another example, a read request that is associated with the first storage device non-exclusively may require the retrieval of data items from the first storage device as well as from one or more storage devices in the storage array. Processes 600-1100 describe the retrieval (or storage) of a single data item in response to a received request. However, it will be understood that in instances in which the received request is associated with multiple data items, each of the data items may be retrieved in the manner discussed with respect to process 6000-1100. Furthermore, processes 600-1100 describe the retrieval (or storage) of a data item based on a latency of a first storage device. According to the example of processes 600-1100, the latency is retrieved from a latency database. The latency database may be the same or similar to the latency database 222, which is discussed above with respect to FIG. 2. As used throughout the disclosure, the term "data item" may refer to a data block, a page, a chunk, and/or any other suitable unit of data. According to the example of FIGS. 6-12B, a storage device array may be rebuilt when the read (or write) latency of first storage device in a storage array is above a threshold. In some implementations, rebuilding the storage device array may include obtaining (e.g., recovering) data that is stored on the first storage device and writing the obtained data to one or more second storage devices in the storage array. Additionally or alternatively, in some implementations, rebuilding the storage device array may include modifying metadata associated with the storage device array to indicate that the first storage device is no longer part of the storage device array. It will be understood that the present disclosure is not limited to any specific method for rebuilding a storage device array (e.g., a RAID array).

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all rekrring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about" "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described mid illustrated in order to explain the nature of the claimed invention might be made by those skilled in the art without departing from the scope of the following claims. (final)

The invention claimed is:

1. A method for use in a storage system, the method comprising:
receiving an I/O command at the storage system;
identifying a latency of a first storage device that is associated with the I/O command, the latency of the first storage device including a latency at which the first storage device has completed a read or write instruction; and
executing the I/O command at least in part based on the latency of the first storage device, wherein executing the I/O command based on the latency of the first storage device includes: performing a first action when the latency of the first storage device is less than a first threshold, and performing a second action when the latency of the first storage device is greater than the first threshold,
wherein the first storage device is part of a storage array, the storage array including one or more second storage devices in addition to the first storage device, and
wherein retrieving the latency of the first storage device includes retrieving the latency of the first storage device from a latency database, the latency database being populated by at least one data node that is executed by a storage server that is part of the storage system, the latency database storing respective latencies of the second storage devices in addition to the latency of the first storage device.

2. The method of claim 1, wherein:
the I/O command includes a read request;
the latency of the first storage device includes a read latency of the first storage device;
performing the first action includes retrieving data associated with the read request from the first storage device; and
performing the second action includes at least one of (i) retrieving the data associated with the read request from one or more of the second storage devices or (ii) calculating the data associated with the read request based on parity data that is stored on one or more of the second storage devices.

3. The method of claim 2, wherein:
the second action is performed when the latency of the first storage device is greater than the first threshold and less than a second threshold,
executing the I/O command further includes performing a third action when the latency of the first storage device is greater than the second threshold, and
performing the third action includes rebuilding the storage array.

4. The method of claim 1, wherein:
the I/O command includes a write request;
the latency of the first storage device includes a write latency of the first storage device;
performing the first action includes writing data associated with the write request to the first storage device; and
performing the second action includes writing the data associated with the write request to a temporary location and subsequently copying the data associated with the write request from the temporary location to the first storage device.

5. The method of claim 4, wherein:
the second action is performed when the latency of the first storage device is greater than the first threshold and less than a second threshold,
executing the I/O command further includes performing a third action when the latency of the first storage device is greater than the second threshold, and
performing the third action includes writing the data associated with the write request to at least one of the second storage devices.

6. The method of claim 1, wherein:
the I/O command includes a mirror write request, the mirror write request including a request to write the data to the first storage device and each of the second storage devices;
the latency of the first storage device includes a write latency of the first storage device;
performing the first action includes writing data associated with the mirror write request to the first storage device and each of the second storage devices; and
performing the second action includes writing the data associated with the mirror write request to the second storage devices but not to the first storage device.

7. A storage server for use in a storage system, comprising:
a memory; and
at least one processor operatively coupled to the memory, the at least one processor being configured to perform the operations of:
receiving an I/O command;
identifying a latency of a first storage device that is associated with the I/O command, the latency of the first storage device including a latency at which the first storage device has completed a read or write instruction; and
executing the I/O command at least in part based on the latency of the first storage device, wherein executing the I/O command based on the latency of the first storage device includes: performing a first action when the latency of the first storage device is less than a first threshold, and performing a second action when the latency of the first storage device is greater than the first threshold,
wherein the first storage device is part of a storage array, the storage array including one or more second storage devices in addition to the first storage device, and wherein retrieving the latency of the first storage device includes retrieving the latency of the first storage device from a latency database, the latency database being populated by at least one data node that is executed by the storage server or by another storage server that is part of the storage system, the latency database storing respective latencies of the second storage devices in addition to the latency of the first storage device.

8. The storage server of claim 7, wherein:
the I/O command includes a read request;
the latency of the first storage device includes a read latency of the first storage device;
performing the first action includes retrieving data associated with the read request from the first storage device; and
performing the second action includes at least one of (i) retrieving the data associated with the read request from one or more of the second storage devices or (ii) calculating the data associated with the read request based on parity data that is stored on one or more of the second storage devices.

9. The storage server of claim 8, wherein:
the second action is performed when the latency of the first storage device is greater than the first threshold and less than a second threshold,
executing the I/O command further includes performing a third action when the latency of the first storage device is greater than the second threshold, and
performing the third action includes rebuilding the storage array.

10. The storage server of claim 8, wherein:
the I/O command includes a write request;
the latency of the first storage device includes a write latency of the first storage device;
performing the first action includes writing data associated with the write request to the first storage device; and
performing the second action includes writing the data associated with the write request to a temporary location and subsequently copying the data associated with the write request from the temporary location to the first storage device.

11. The storage server of claim 10, wherein:
the second action is performed when the latency of the first storage device is greater than the first threshold and less than a second threshold,
executing the I/O command further includes performing a third action when the latency of the first storage device is greater than the second threshold, and
performing the third action includes writing the data associated with the write request to at least one of the second storage devices.

12. The storage server of claim 7, wherein:
the I/O command includes a mirror write request, the mirror write request including a request to write the data to the first storage device and each of the second storage devices;
the latency of the first storage device includes a write latency of the first storage device;
performing the first action includes writing data associated with the mirror write request to the first storage device and each of the second storage devices; and
performing the second action includes writing the data associated with the mirror write request to the second storage devices but not to the first storage device.

13. A non-transitory computer-readable storage medium that is configured to store one or more processor-executable instructions, which when executed by at least one processor of a storage system further cause the at least one processor to perform the operations of:
receiving an I/O command;
identifying a latency of a first storage device that is associated with the I/O command, the latency of the first storage device including a latency at which the first storage device has completed a read or write instruction; and
executing the I/O command at least in part based on the latency of the first storage device, wherein executing the I/O command based on the latency of the first storage device includes: performing a first action when the latency of the first storage device is less than a first threshold, and performing a second action when the latency of the first storage device is greater than the first threshold,
wherein the first storage device is part of a storage array, the storage array including one or more second storage devices in addition to the first storage device, and
wherein retrieving the latency of the first storage device includes retrieving the latency of the first storage device from a latency database, the latency database being populated by at least one data node that is executed by the at least one processor or by another processor of the storage system, the latency database storing respective latencies of the second storage devices in addition to the latency of the first storage device.

14. The non-transitory computer-readable storage medium of claim 13, wherein:
the I/O command includes a read request;
the latency of the first storage device includes a read latency of the first storage device;
performing the first action includes retrieving data associated with the read request from the first storage device; and
performing the second action includes at least one of (i) retrieving the data associated with the read request from one or more of the second storage devices or (ii) calculating the data associated with the read request based on parity data that is stored on one or more of the second storage devices.

15. The non-transitory computer-readable storage medium of claim 14, wherein:
the second action is performed when the latency of the first storage device is greater than the first threshold and less than a second threshold,
executing the I/O command further includes performing a third action when the latency of the first storage device is greater than the second threshold, and
performing the third action includes rebuilding the storage array.

16. The non-transitory computer-readable storage medium of claim 13, wherein:
the I/O command includes a write request;
the latency of the first storage device includes a write latency of the first storage device;
performing the first action includes writing data associated with the write request to the first storage device; and
performing the second action includes writing the data associated with the write request to a temporary location and subsequently copying the data associated with the write request from the temporary location to the first storage device.

17. The non-transitory computer-readable storage medium of claim 16, wherein:
the second action is performed when the latency of the first storage device is greater than the first threshold and less than a second threshold,
executing the I/O command further includes performing a third action when the latency of the first storage device is greater than the second threshold, and
performing the third action includes writing the data associated with the write request to at least one of the second storage devices.

\* \* \* \* \*